March 14, 1961   E. T. LEWIS   2,974,463
GRASS MOWING UNIT

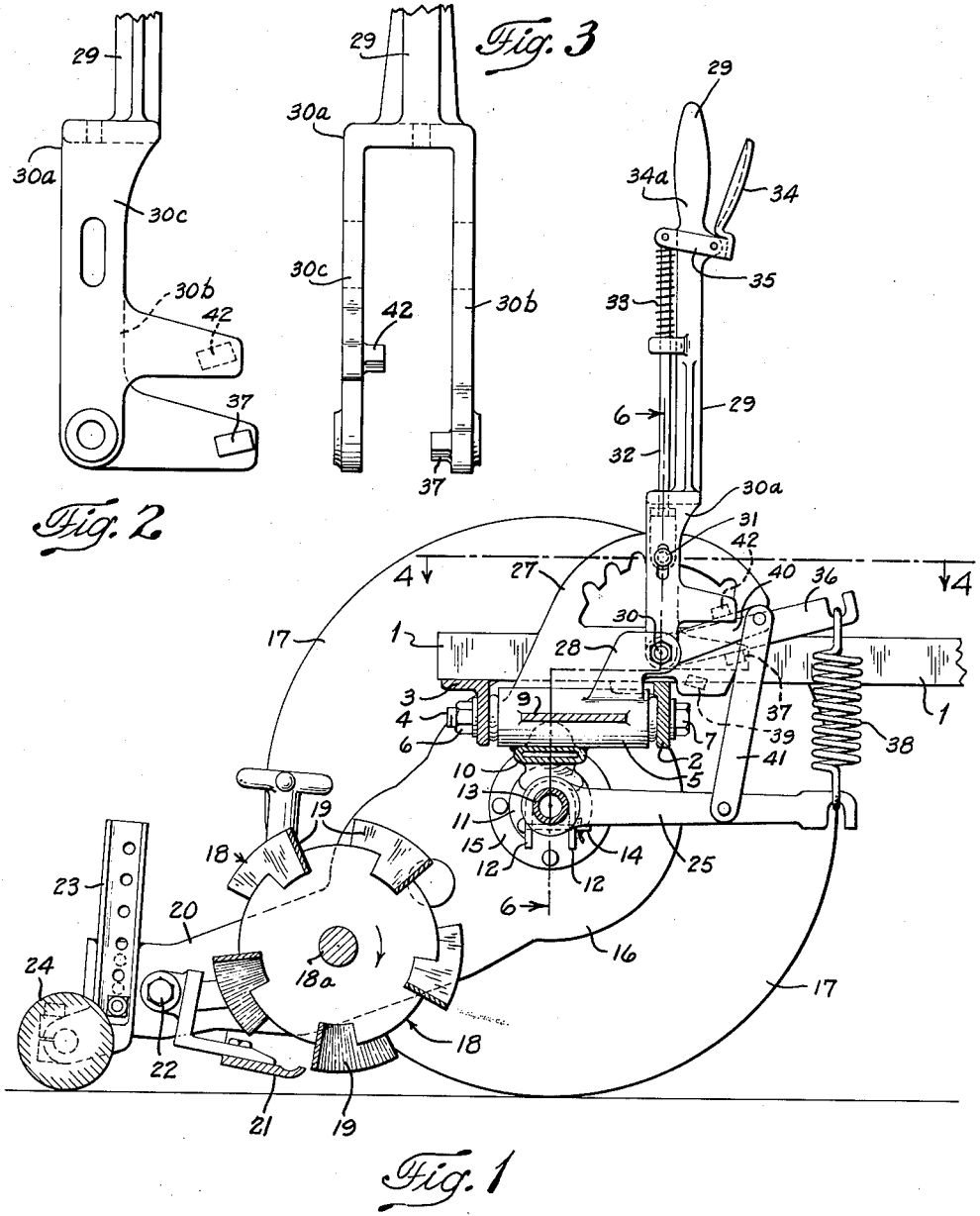

Filed May 11, 1959   3 Sheets-Sheet 2

INVENTOR
EVAN T. LEWIS
BY
Morgan, Finnegan, Durham & Pine
ATTORNEYS.

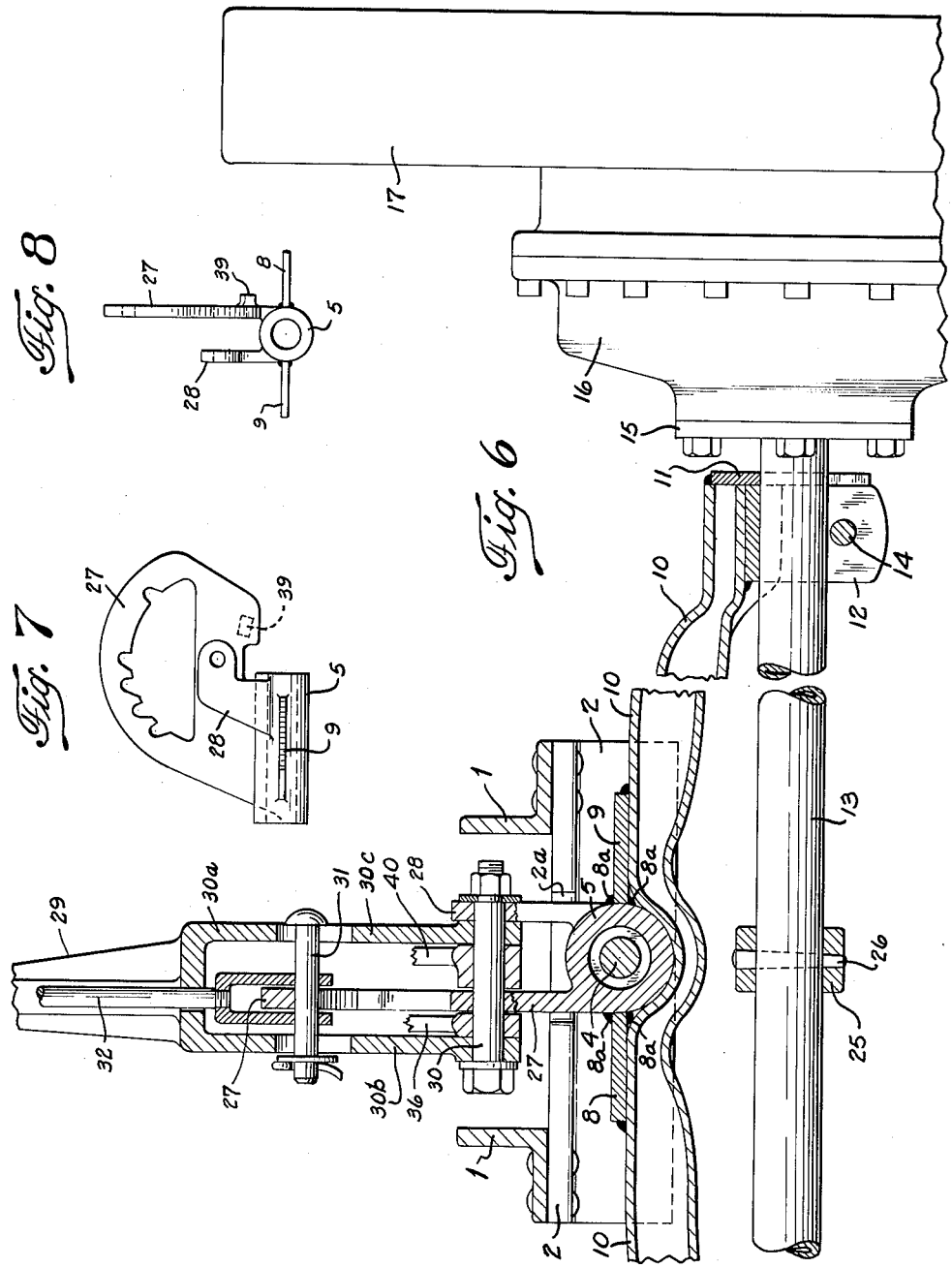

United States Patent Office 2,974,463
Patented Mar. 14, 1961

2,974,463
GRASS MOWING UNIT
Evan T. Lewis, 400 N. 8th St., Stroudsburg, Pa.
Filed May 11, 1959, Ser. No. 812,530
4 Claims. (Cl. 56—7)

This invention relates to grass cutting mowers of the reel type, and particularly relates to gang mowing units which employ a number of reel cutting units that are pulled and carried by a wheeled frame under the power of a tractor.

With such devices it is customary to provide an arrangement for mounting the reel units to the frame which permits each reel unit to pivot upwardly and downwardly. This mounting arrangement is desirable, firstly, because it is necessary that the reel units follow the contours of the ground, secondly, because it is very convenient to raise the reel units away from the ground to a taxiing position while the entire apparatus is moved to another mowing location at substantial speeds. For these reasons, the reel unit is pivotally mounted to the tractor frame and it is the practice in the art to provide a series of levers connecting the reel unit to a movable control handle so that the operator may elevate the reel unit to taxiing position by exerting manual force against the control handle.

However, with such pivotal mountings, the resistance of the grass to cutting creates a torque which tends to pivot the reel unit away from the ground during mowing. This results in an uneven and unsatisfactory mowing effect. In order to avoid such disadvantages, it is a common practice to arrange additional levers and a tension spring between the reel unit and the control handle so that exertion of manual force on the control handle in the opposite direction will load the spring and exert a pressure downwardly on the reel unit so that the reel unit resists motion away from the ground during mowing.

With these arrangements of reel unit-frame mounting and lifting and depressing levers, substantial manual strength is required to elevate the reel units to taxiing position. Such elevation requires force not only against the weight of the reel unit but also tends to further load the spring. The forces involved in elevating the reel unit are opposed to and move in directions opposite to the forces involved in maintaining the reel unit pressed against the ground. The strength required is particularly great with the heavy duty type gang mowing units that are used in maintaining the grass of golf courses and other large areas.

These difficulties are obviated by the present invention. Speaking generally, the present invention provides a pivotal mounting arrangement and reel unit lifting and depressing arrangement which requires little strength for elevation of the reel unit to taxiing position. And, when the reel unit is in taxiing position, it is firmly held in a secure manner so that the reel unit does not tend to jounce while the entire mowing unit is moved to another location at high speed. In addition, the reel unit is held firmly pressed against the ground during the mowing operation with a pressure sufficient to overcome grass cutting torque. Any one of a variety of such pressures may be pre-selected depending upon the nature and quality of the grass being cut.

Briefly, the invention accomplishes these results by providing a reel unit lifting and depressing arrangement for grass cutting machines which have a frame on traction wheels, i.e. a wheeled frame, to carry and pull at least one reel unit which is connected to and mounted on the frame for pivoting about an axis from depressed mowing position pressed against the ground to and from elevated taxiing position and which also has a power source provided to pull the frame. The means for raising and lowering the reel unit includes an arm which is fixed to the reel unit and extends longitudinally forwardly therefrom for pivotal movement with the reel unit. A pair of levers are also provided and are pivotally mounted on the frame for movement relative to each other. A control handle is pivotally mounted on the frame adjacent the pair of levers and has spaced stops engaging opposite sides of the levers of the pair while allowing independent pivotal motion of the levers. A compression link is provided between and connecting one lever of the pair to the arm and a tension spring is provided between and connecting the other lever of the pair to the arm. A stop is fixedly mounted on the frame to be engaged by the lever to which the tension spring is connected when the reel unit is raised to taxiing position. And, the control handle is engageable to move one lever of the pair of levers to raise the reel unit from the ground and is reversibly movable to disengage from that lever and to engage and move the other lever to which the tension spring is connected away from the fixed stop to lower the reel unit and press it against the ground.

Preferably, the control handle is pivotally mounted on the frame to extend upwardly therefrom and the pair of levers are pivotally mounted on the frame to extend longitudinally forwardly so that the control handle is moved forwardly to raise the reel unit from the ground and is moved rearwardly to press the reel unit against the ground.

Still more preferably, the pivot point for the control handle is located forwardly of and vertically above the axis about which the reel unit pivots.

Having described the nature of the invention generally, the details of the invention will now be described by reference to a preferred embodiment of the invention illustrated in the drawings. In the drawings:

Figure 1 is a side view, partly in section, of the apparatus of the invention in the usual grass cutting position;

Figure 2 is an enlarged side view of the lower portion of the control handle that forms a part of the invention;

Figure 3 is an enlarged front view of the lower portion of the control handle;

Figure 6 is an enlarged fragmentary transverse section view along the line 6—6 of Figure 1;

Figure 7 is a side elevation of the cylindrical hinge that forms a part of the invention; and Figure 8 is a front elevation of the cylindrical hinge.

Figure 4:
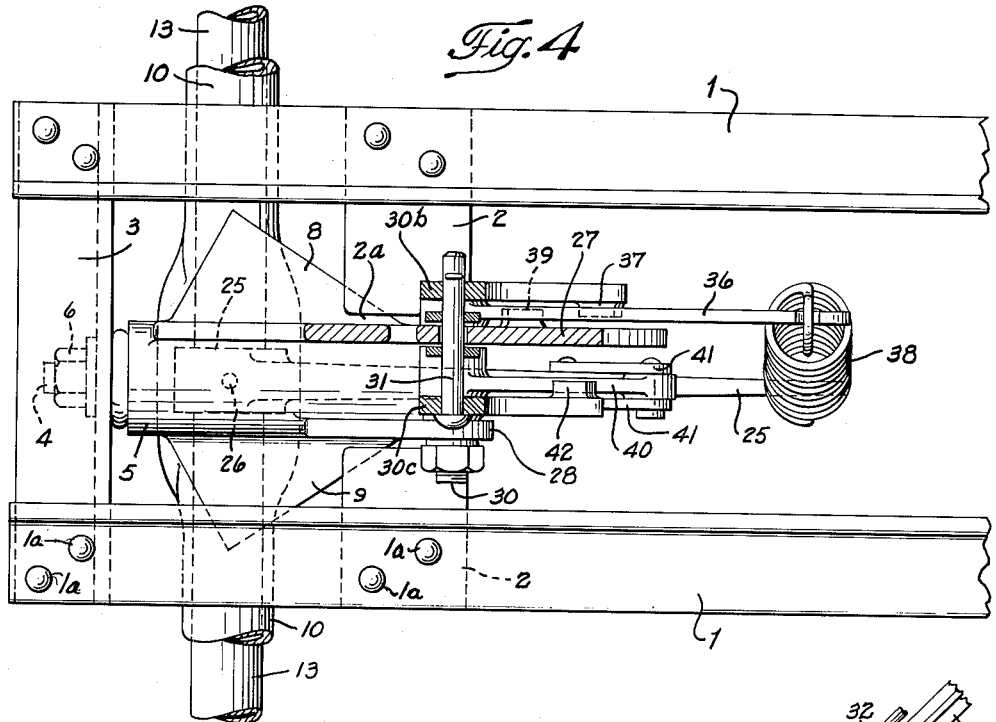
Figure 4 is an enlarged plan section view taken along the line 4—4 of Figure 1.

Referring now to the preferred embodiment of the invention shown for illustration in the drawings, a tractor gang mowing unit frame is carried by traction wheels 17 in a plane parallel to the ground, as will be understood, and includes two longitudinally extending steel angle bars 1 (see Figure 1). A forward lateral steel angle bar 2 and a rear steel angle bar 3 are fastened underneath longitudinal angle bars 1 (as by rivets 1a, for example), parallel to one another to complete the portion of the tractor frame that carries the reel unit and control mounting hereinafter referred to. This frame together with the traction wheels 17 constitute a wheeled frame, as will be understood.

The lateral angle bars 2 and 3 journal a pintle pin 4 of a cylindrical hinge 5 that extends longitudinally between the longitudinal angle bars 2 and 3. The hinge is held on the pintle pin 4 by a nut 6 and head 7. This arrangement fixes the hinge in the plane of the tractor frame.

Two laterally extending wing plates 8 and 9 are fixed in the plane of the tractor frame by welding 8a to the hinge 5, and the wing plates in turn are welded to and support a transverse hollow steel beam 10 (see Figure 6). Yoke members consisting of yoke plates 11 and cleats 12 are welded to the ends of the beam 10 to journal an axial tie rod 13. A cotter pin 14 in each cleat 13 retains the axial tie rod 13 in position within the yoke members.

Figure 5:
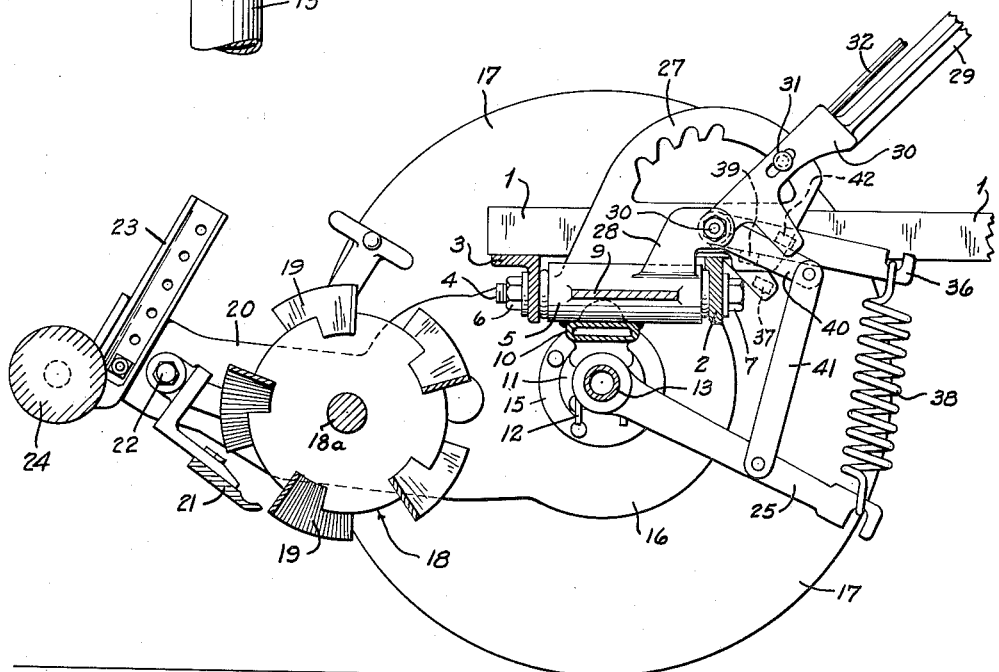
Figure 5 is a view similar to Figure 1 but with the apparatus of the invention shown in transportation or taxiing position.

The axial tie rod 13 has circular flanges 15 at its ends which are bolted to bearing housings 16. The bearing housings 16 in turn are connected to the traction wheels 17. These traction wheels 17 have the usual internal gears (not shown) that are connected with and drive a pinion in a side plate 20 of a mower reel unit 18 to rotate reel blades 19 in the direction of the arrow of Figure 1, as will be understood as shown in Figs. 1 and 5, reel unit 18 is mounted in a conventional manner on rod 18a which is connected at its ends to housings 16. The usual bed knife 21 is attached to the reel unit side plates 20 by adjustable nuts 22 which permit the position of the bed-knife to be varied in relation to the cutting arc of the reel blades 19. The reel side plates 20 also carry standards 23 that support the reel roller 24 in a variety of pre-selected positions.

With the construction described above the entire reel unit is pulled and carried by the frame at cylindrical hinge 5 and, therefore, can rock transversely on the hinge. In addition, the reel unit pivots upwardly (Fig. 5) and downwardly (Fig. 1) on axial tie rod 13—the tie rod coinciding with the axis about which the reel unit pivots.

An arm 25 is fixed at its rear end to the axial tie rod 13 by a securing pin 26 directly beneath the cylindrical hinge (Fig. 6) and extends forwardly longitudinally. Since arm 25 is fixed at its rear end to axial tie rod 13 and axial tie rod 13, in turn, is connected to bearing housings 16 which support rod 18a on which reel unit 18 is supported, pivotal movement of arm 25 causes movement of reel unit 18 in the same direction.

The cylindrical hinge 5 has two upwardly extending integral quadrant members 27 and 28, each of them extending between longitudinal angle members 1 and through a cut-out 2a provided in forward lateral angle member 2 of the tractor frame. A control handle 29 has a lower yoke portion 30a which is mounted on these quadrants for pivotal movement thereon by a bolt 30, the bolt 30 extending through orifices provided in the quadrant members above and slightly forward of the cylindrical hinge and through the legs of the yoke portion 30a. Thus, the pivot point for the control handle 29 is well forward of and vertically above the axis about which the reel unit pivots at tie rod 13. The legs of the lower yoke portion 30a of the control handle 29 have small slots which hold a large snap pin 31 that is continually urged upwardly by a rod 32 and spring 33 on the upper portion of the control handle 29. The snap pin 31 extends through a cut-out in quadrant member 27, the cut-out having upper notches. Control handle 29 has at its upper end grip member 34 which is fixed to a pivot bar 35, which in turn is pivotally attached to a second grip member 34a and to rod 32 to lower the rod and the cotter pin 31 when the first grip 34 is compressed toward the second grip 34a. Thus, the control handle may be pivoted and set in a number of pre-selected angular positions, the snap pin 31 occupying any of the notches desired to hold the handle lever 29 in the particular position selected.

A pair of levers 36 and 40 are pivotally mounted on the frame adjacent the control handle 29 for independent pivotal movement. In the illustrative embodiment of the invention shown in the drawing, these levers are mounted at the same pivot point on bolt 30 as control handle 29.

Depress lever 36 is pivotally mounted on bolt 30 and extends longitudinally forwardly between left quadrant 27 and the left yoke leg 30b of the control handle 29 as shown in Figure 6. Left yoke leg 30b has a protruding portion with an inwardly projecting lug 37 which engages the underside of depress lever 36 when control handle 29 is pivoted rearwardly. Depress lever 36 is constantly urged downwardly by a tension spring 38 connecting its free end and arm 25. When the control handle 29 with its lug 37 is pushed forwardly, the tension of spring 38 pulls the depress lever 36 downwardly until depress lever 36 abuts against a stop 39 on left quadrant 27.

Lift lever 40, of the pair, is similarly pivotally mounted on bolt 30 to extend longitudinally forwardly between left quadrant 27 and right yoke leg 30c so as to lie close to said right yoke leg 30c. A compression link 41 is connected to the free end of lift lever 40 and to the body of arm 25 at a point about two-thirds of its length from its attached end at beam 13. Right yoke leg 30c of handle lever 29 has a small portion protruding forwardly with a lug 42 facing toward lift lever 40, so that upon forward movement of control handle 29 the lug engages the upper side of lever 40 and forces it downwardly, thereby also forcing link 41 and arm 25 downwardly.

In operation of the invention to cut grass, the control handle 29 is moved rearwardly and downwardly from its normal upright position until the snap pin 31 engages one of the rear notches in left quadrant member 27. This rearward motion of control handle 29 causes lug 37 of the left yoke leg 30b thereon to engage and raise depress lever 36 against the tension of the spring 38. See Figure 1. The upward tension of the spring tends to pull arm 25 upwardly and, therefore, tends to rotate axial tie rod 13 and the reel unit thereon counter-clockwise thereby pressing roller 24 downwardly to hold the bed-knife 21 and reel cutting blades 19 firmly against the ground. No interference with the rearward motion of control handle 29 is caused by the reel unit elevating mechanism, i.e. lift lever 40, compression link 41, etc., since the lug 42 travels with the control handle and becomes spaced from lever 40, which permits arm 25 and compression link 41 to move lift lever 40 upwardly. Lift lever 40 travels with depress lever 36. The control handle lever 29 can be moved to load the tension spring without great strength by the operator. With the control handle 29 in a rear position, the tension on the spring 38 constantly tends to pull arm 25 upwardly to hold the reel firmly against the ground, but the engagement of lug 42 with lift lever 40 fixes an upper limit beyond which arm 25 can not bounce or be raised thereby securely holding the reel unit under a firm control.

The downward pressure on the roller, bed-knife and reel cutting blade can be increased by pushing the control handle 29 still further rearwardly to a more rearwardly located notch. The lug 37 is raised and the lug 42 is raised. This further increases the tension on spring 38 which is transmitted to axial tie rod 13 and the reel unit.

In operation of the invention for purposes of taxiing the apparatus to a different location, the control handle lever 29 is moved clock-wise forwardly and downwardly to engage the snap pin 31 in the extreme forward notch. During this motion, lug 42 on right yoke leg 30c engages lift lever 40 and moves it downwardly, thereby moving compression link 41 and arm 25 downwardly. At the same time, lug 37 moves downwardly with left yoke leg 30b thereby permitting depress lever 36 to travel downwardly with lift lever 40. As a result of this simultaneous clockwise travel of the pair of levers 36 and 40, very little effort is needed to move control handle lever 29 forwardly as described. The tension on spring 58 offers no resistance to the motion. Arm 25 thereby rotates axial tie rod 13 clockwise to elevate the reel unit and roller 24 toward the taxiing position shown in Figure 5. However, just before the end of the forward motion of control handle 29, depress lever 36 abuts against fixed stop 39 on left quadrant 27 thereby precluding any further movement of depress lever 36. At this point, the control handle 29 is in a forward and downward position where the operator's weight is naturally applied to the control handle. The rest of the motion necessary to snap cotter pin 37 into the forward notch requires a brief exertion of strength to apply an increased load on the spring 38. This snaps control handle 29 to its forward location and the reel unit is now held away from the ground in the taxiing position of Figure 5. The entire apparatus may be transported to another location at substantial speeds with the reel unit snugly held against jouncing by tension spring 38.

Since modifications and variations may be made in the embodiment of the invention illustrated and specifically described above without departing from the principles of the invention, it is to be understood that the invention is not limited to the details illustrated and described except as expressly stated hereinafter in the claims.

I claim:

1. A grass cutting machine comprising a frame for pulling and carrying a reel unit, a reel unit pivotally mounted on the frame and adapted to be raised and lowered from mowing position pressed against the ground to taxiing position away from the ground, and means connected to said frame for raising and lowering said reel unit to a mowing position and a taxiing position, said raising and lowering means comprising, an arm extending forwardly of said reel unit and means supported by said frame connecting the rear end of said arm and said reel unit whereby pivotal movement of said arm causes pivotal movement of said reel unit in the same direction, a depression lever and a lift lever pivotally mounted on lever supporting means supported by said frame with the free ends of said levers extending forwardly for movement relative to each other, a tension spring between and connecting the free end of said depression lever and the free end of said arm, a compression link between and connecting the free end of said lift lever and said arm, a control handle pivotally mounted on said lever supporting means to extend upwardly therefrom adjacent the depression lever and lift lever and having a first stop and a second stop making up a pair of two stops spaced from one another on the forward side of the pivot point about which the control handle pivots, the first stop being positioned on the control handle to engage the upper side of the lift lever to move the lift lever and the compression link and the arm to raise the reel unit connected therewith to taxiing position when the control handle is moved forwardly, the second stop being positioned on the control handle to engage the under side of the depression lever to move said depression lever and load the tension spring to move the arm and the reel unit adapted to move therewith to mowing position when the control handle is moved rearwardly, the first stop being positioned on the control handle for disengagement from the lift lever when the control handle is moved rearwardly whereby movement of the lift lever is unencumbered by the control handle during lowering of the reel unit, and the second stop being positioned on the control handle for disengagement from the depression lever when the control handle is moved forwardly to raise the reel unit whereby movement of the depression lever is unencumbered by the control handle during raising of the reel unit.

2. A grass cutting machine according to claim 1, wherein a fixed stop is positioned on the lever supporting means to be engaged by the depression lever to which the tension spring is connected at a point just short of the fully raised position of the reel unit whereby further forward movement of the control handle to fully elevate the reel unit causes slight loading of said tension spring.

3. The subject matter of claim 1 characterized by the fact that the point about which the control handle pivots is forward of and above the axis about which the reel unit pivots.

4. The subject matter of claim 3 characterized by the fact that the pivot point about which the levers pivot is forward of and above the axis about which the reel unit pivots.

References Cited in the file of this patent

UNITED STATES PATENTS

| 1,398,481 | Worthington | Nov. 29, 1921 |
| 2,783,700 | Sindelar | Mar. 5, 1957 |

FOREIGN PATENTS

| 163,300 | Great Britain | July 27, 1922 |